(12) United States Patent
Meng et al.

(10) Patent No.: US 9,886,264 B2
(45) Date of Patent: Feb. 6, 2018

(54) METHOD AND DEVICE FOR UPGRADING FIRMWARE

(71) Applicant: Xiaomi Inc., Beijing (CN)

(72) Inventors: Deguo Meng, Beijing (CN); Xin Liu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/841,911

(22) Filed: Sep. 1, 2015

(65) Prior Publication Data

US 2016/0162284 A1    Jun. 9, 2016

Related U.S. Application Data

(63) Continuation of application No. PCT/CN2015/077855, filed on Apr. 29, 2015.

(30) Foreign Application Priority Data

Dec. 9, 2014    (CN) .......................... 2014 1 0751727

(51) Int. Cl.
  *G06F 9/44*    (2006.01)
  *G06F 9/445*    (2006.01)

(52) U.S. Cl.
  CPC .................... *G06F 8/665* (2013.01)

(58) Field of Classification Search
  CPC ..................................... G06F 8/665
  USPC ............................... 717/168–178
  See application file for complete search history.

(56) References Cited

U.S. PATENT DOCUMENTS

| 5,859,911 A * | 1/1999 | Angelo | G06F 12/1408 711/E12.092 |
|---|---|---|---|
| 5,974,528 A * | 10/1999 | Tsai | G06F 8/665 710/14 |
| 6,154,838 A * | 11/2000 | Le | G06F 9/4401 710/10 |
| 6,594,757 B1 * | 7/2003 | Martinez | G06F 8/65 709/221 |

(Continued)

FOREIGN PATENT DOCUMENTS

| CN | 102945174 A | 2/2013 |
|---|---|---|
| CN | 103116502 A | 5/2013 |

(Continued)

OTHER PUBLICATIONS

International Search Report of PCT/CN2015/077855, mailed from the State Intellectual Property Office of China dated Aug. 28, 2015.

(Continued)

*Primary Examiner* — Francisco Aponte
(74) *Attorney, Agent, or Firm* — Finnegan, Henderson, Farabow, Garrett & Dunner LLP (57) ABSTRACT

A method for upgrading firmware in a device, includes: when firmware of a first chip in the device needs to be upgraded, identifying a first partition of a flash memory in a second chip in the device, the first partition being a backup partition for downloading firmware of the second chip; downloading new firmware of the first chip to the first partition of the flash memory in the second chip; and copying the new firmware of the first chip from the first partition of the flash memory in the second chip to an effective region in the first chip.

9 Claims, 11 Drawing Sheets

(56) References Cited

U.S. PATENT DOCUMENTS

| | | | |
|---|---|---|---|
| 6,725,178 B2 * | 4/2004 | Cheston | G06F 9/4401 702/186 |
| 6,732,267 B1 * | 5/2004 | Wu | H04L 41/082 713/100 |
| 6,757,838 B1 * | 6/2004 | Chaiken | G06F 9/4403 714/15 |
| 6,971,095 B2 * | 11/2005 | Hirai | G06F 8/65 713/2 |
| 6,990,577 B2 * | 1/2006 | Autry | G06F 8/65 713/1 |
| 7,000,101 B2 * | 2/2006 | Wu | G06F 8/65 713/1 |
| 7,111,203 B2 * | 9/2006 | Hu | G06F 11/1417 713/1 |
| 7,305,567 B1 * | 12/2007 | Hussain | H04L 9/0643 380/264 |
| 7,571,156 B1 * | 8/2009 | Gupta | H04L 45/00 |
| 7,698,698 B2 * | 4/2010 | Skan | G06F 8/63 717/168 |
| 7,827,348 B2 * | 11/2010 | Lee | G06F 11/1068 711/103 |
| 8,108,663 B2 * | 1/2012 | Cho | G06F 8/66 713/1 |
| 8,181,007 B2 * | 5/2012 | Liu | G06F 11/1433 713/1 |
| 8,320,302 B2 * | 11/2012 | Richeson | H04M 11/002 370/328 |
| 8,429,640 B2 * | 4/2013 | Yin | G06F 8/65 717/168 |
| 8,499,295 B2 * | 7/2013 | Selvam | G06F 8/66 717/168 |
| 8,554,748 B1 * | 10/2013 | Kamity | G06F 9/44578 707/634 |
| 8,719,810 B2 | 5/2014 | Oh | |
| 8,745,614 B2 * | 6/2014 | Banerjee | G06F 8/665 717/168 |
| 9,219,617 B2 * | 12/2015 | Newton | H04L 12/4641 |
| 9,495,178 B2 | 11/2016 | Futami | |
| 9,684,684 B2 * | 6/2017 | Mottupalli | G06F 17/3038 |
| 2004/0215755 A1 * | 10/2004 | O'Neill | G06F 8/65 709/223 |
| 2005/0055595 A1 | 3/2005 | Frazer et al. | |
| 2005/0268296 A1 * | 12/2005 | Marolia | G06F 8/65 717/168 |
| 2007/0294685 A1 | 12/2007 | Oh | |
| 2007/0294686 A1 | 12/2007 | Oh | |
| 2008/0028385 A1 * | 1/2008 | Brown | G06F 8/65 717/170 |
| 2008/0216066 A1 | 9/2008 | Oh | |
| 2008/0307157 A1 * | 12/2008 | Jang | G06F 8/65 711/103 |
| 2010/0268867 A1 * | 10/2010 | Gyl | G06F 8/65 711/103 |
| 2010/0313191 A1 | 12/2010 | Yin et al. | |
| 2011/0055844 A1 * | 3/2011 | Nguyen | G06F 1/20 718/104 |
| 2011/0179407 A1 * | 7/2011 | Minegishi | G06F 8/65 717/170 |
| 2012/0047499 A1 * | 2/2012 | Krzystofczyk | G06F 8/63 717/174 |
| 2012/0143873 A1 * | 6/2012 | Saadat | G06F 17/30584 707/741 |
| 2013/0125107 A1 * | 5/2013 | Bandakka | G06F 8/665 717/171 |
| 2014/0007071 A1 | 1/2014 | Chang et al. | |
| 2014/0173579 A1 * | 6/2014 | McDonald | G06F 8/65 717/170 |
| 2014/0173580 A1 * | 6/2014 | McDonald | G06F 11/1433 717/170 |
| 2014/0229707 A1 | 8/2014 | Futami | |
| 2014/0237461 A1 * | 8/2014 | Kamity | G06F 13/00 717/169 |

FOREIGN PATENT DOCUMENTS

| | | |
|---|---|---|
| CN | 104484200 A | 4/2015 |
| JP | 2008-104036 A | 5/2008 |
| JP | 2014-153964 A | 8/2014 |
| JP | 2014-194682 A | 10/2014 |
| KR | 10-2010-0066576 | 6/2010 |
| KR | 10-2014-0059604 | 5/2014 |
| RU | 2388045 C2 | 4/2010 |
| RU | 2419839 C2 | 5/2011 |

OTHER PUBLICATIONS

English version of International Search Report of PCT/CN2015/077855, mailed from the State Intellectual Property Office of China on Aug. 28, 2015.

Extended European Search Report of European Patent Application No. 15193088.0, from the European Patent Office, dated Apr. 11, 2016.

Office Action for Russian Application No. 2015131124/08(047967), dated Apr. 10, 2017.

* cited by examiner

METHOD AND DEVICE FOR UPGRADING FIRMWARE

CROSS-REFERENCE TO RELATED APPLICATIONS

The present application is a continuation of International Application No. PCT/CN2015/077855, filed Apr. 29, 2015, which is based upon and claims priority to Chinese Patent Application No. 201410751727.3, filed Dec. 9, 2014, the entire contents of all of which are incorporated herein by reference.

TECHNICAL FIELD

The present disclosure generally relates to the field of computer technologies and, more particularly, to a method and a device for upgrading firmware.

BACKGROUND

Generally, firmware of a chip in a device can be upgraded with a newer version, for the purpose of improving the function and stability of the device. Such chip may be a Micro Control Unit (MCU), a MCU-like chip, or a non-MCU chip (e.g., WiFi chip, Bluetooth chip, etc.). In a smart device, firmware upgrade may be needed for multiple chips. Conventionally, firmware in each of these chips is individually upgraded, which may waste resources of the smart device.

SUMMARY

According to a first aspect of the present disclosure, there is provided a method for upgrading firmware in a device, comprising: when firmware of a first chip in the device needs to be upgraded, identifying a first partition of a flash memory in a second chip in the device, the first partition being a backup partition for downloading firmware of the second chip; downloading new firmware of the first chip to the first partition of the flash memory in the second chip; and copying the new firmware of the first chip from the first partition of the flash memory in the second chip to an effective region in the first chip.

According to a second aspect of the present disclosure, there is provided a device, comprising: a processor; and a memory for storing instructions executable by the processor; wherein the processor is configured to: when firmware of a first chip in the device needs to be upgraded, identify a first partition of a flash memory in a second chip in the device, the first partition being a backup partition for downloading firmware of the second chip; download new firmware of the first chip to the first partition of the flash memory in the second chip; and copy the new firmware of the first chip from the first partition of the flash memory in the second chip to an effective region in the first chip.

According to a third aspect of the present disclosure, there is provided a non-transitory computer-readable storage medium storing instructions that, when executed by one or more processors of a device, cause the device to perform a method for upgrading firmware, the method comprising: when firmware of a first chip in the device needs to be upgraded, identifying a first partition of a flash memory in a second chip in the device, the first partition being a backup partition for downloading firmware of the second chip; downloading new firmware of the first chip to the first partition of the flash memory in the second chip; and copying the new firmware of the first chip from the first partition of the flash memory in the second chip to an effective region in the first chip.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
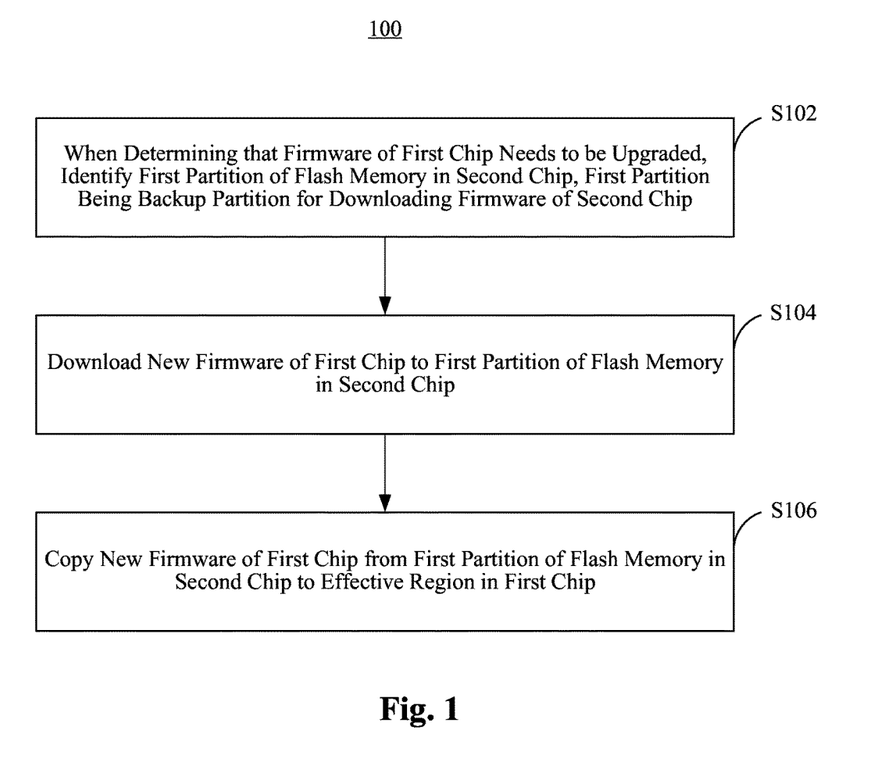
FIG. 1 is a flowchart of a method for upgrading firmware, according to an exemplary embodiment.

FIG. 1 is a flowchart of a method 100 for upgrading firmware, according to an exemplary embodiment. For example, the method 100 may be applied in a smart device, such as a smart plug, a smart television, a smart air conditioner, a smart phone, etc. The smart device includes at least a first chip and a second chip. Referring to FIG. 1, the method 100 includes the following steps.

In step S102, when determining that firmware of the first chip needs to be upgraded, the smart device identifies a first partition of a flash memory in the second chip. For example, the first partition is a backup partition for downloading firmware of the second chip.

In exemplary embodiments, the firmware of the first chip is triggered to be upgraded by remote control or by triggering a button on the smart device.

In exemplary embodiments, the first and second chips can be any types of chips, and at least the second chip includes a flash memory. For example, the first chip may be a non-MCU chip, such as a Bluetooth chip or a WiFi chip, and the second chip may be a MCU chip or a MCU-like chip. For another example, the first chip may be a MCU chip, and the second chip may be a non-MCU chip.

In exemplary embodiments, the flash memory in the second chip also includes a second partition. The second partition is an active partition for storing firmware currently used by the second chip.

In step S104, the smart device downloads new firmware of the first chip to the first partition of the flash memory in the second chip.

In exemplary embodiments, the smart device may download the new firmware of the first chip via the Internet.

In step S106, the smart device copies the new firmware of the first chip from the first partition of the flash memory in the second chip to an effective region in the first chip.

In exemplary embodiments, the smart device may determine the effective region in the first chip according to a type of the new firmware.

In one exemplary embodiment, when determining that the firmware of the second chip needs to be upgraded, the smart device downloads new firmware of the second chip to the first partition. The smart device activates the first partition to be the active partition for storing firmware used by the second chip. The smart device also sets the second partition of the flash memory to be the backup partition for downloading firmware of the second chip.

In some embodiments, step S102 may further include the following sub-steps.

In a first sub-step, the smart device acquires partition information regarding the flash memory in the second chip.

In a second sub-step, the smart device identifies the first partition of the flash memory in the second chip, according to the partition information.

In some embodiments, the method 100 may further include verifying the new firmware of the first chip after it is downloaded to the first partition of the flash memory in the second chip.

The method 100 avoids conflicts caused by upgrading firmware of multiple chips simultaneously, and therefore can improve the reliability of firmware upgrade. Moreover, by using the flash memory in the second chip for upgrading the firmware of the first chip, the method 100 avoids additional control logic during firmware upgrade, and therefore can save resources of the smart device.

Figure 2:
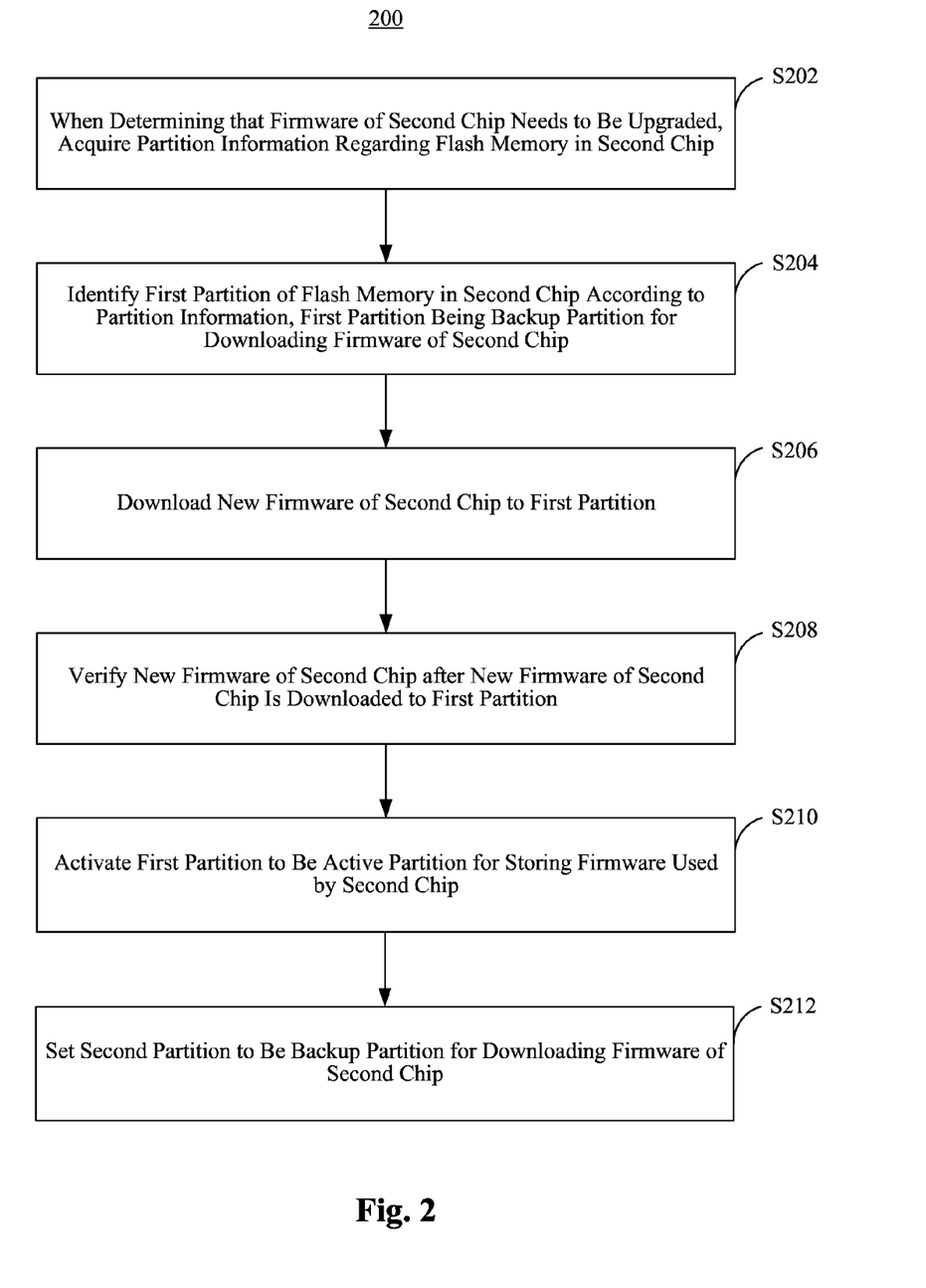
FIG. 2 is a flowchart of a method for upgrading firmware, according to an exemplary embodiment.

FIG. 2 is a flowchart of a method 200 for upgrading firmware, according to an exemplary embodiment. For example, the method 200 may be applied in a smart device, such as a smart plug, a smart television, a smart air conditioner, a smart phone, etc. The smart device may include a first chip and a second chip. The first chip may be a non-MCU chip, such as a WiFi chip, a Bluetooth chip, etc. The second chip may be a MCU chip including at least a flash memory. Referring to FIG. 2, the method 200 includes the following steps.

In step S202, when determining that the firmware of the second chip needs to be upgraded, the smart device acquires partition information regarding the flash memory in the second chip.

In exemplary embodiments, similar to step S102 (FIG. 1), the firmware of the second chip may be triggered to be upgraded by remote control or by triggering a button on the smart device. The flash memory in the second chip may include a first partition and a second partition. For example, the first partition is a backup partition for downloading the firmware of the second chip. Also for example, the second partition is an active partition for storing firmware currently used by the second chip. The partition information indicates the locations of the first and second partitions in the flash memory.

In step S204, the smart device identifies the first partition of the flash memory in the second chip being the backup partition, according to the partition information.

In step S206, the smart device downloads new firmware of the second chip to the first partition.

In step S208, the smart device verifies new firmware of the second chip after the new firmware of the second chip is downloaded to the first partition.

In exemplary embodiments, the new firmware of the second chip may be downloaded similar to step 104 (FIG. 1). The smart device may verify the new firmware of the second chip through Cyclic Redundancy Check (CRC), or based on format information of the new firmware. By this verification, the smart device confirms that the new firmware is operable, and the firmware upgrade is reliable.

In step S210, the smart device activates the first partition to be an active partition for storing firmware used by the second chip.

In step S212, the smart device sets the second partition to be a backup partition for downloading firmware of the second chip.

Figure 3:
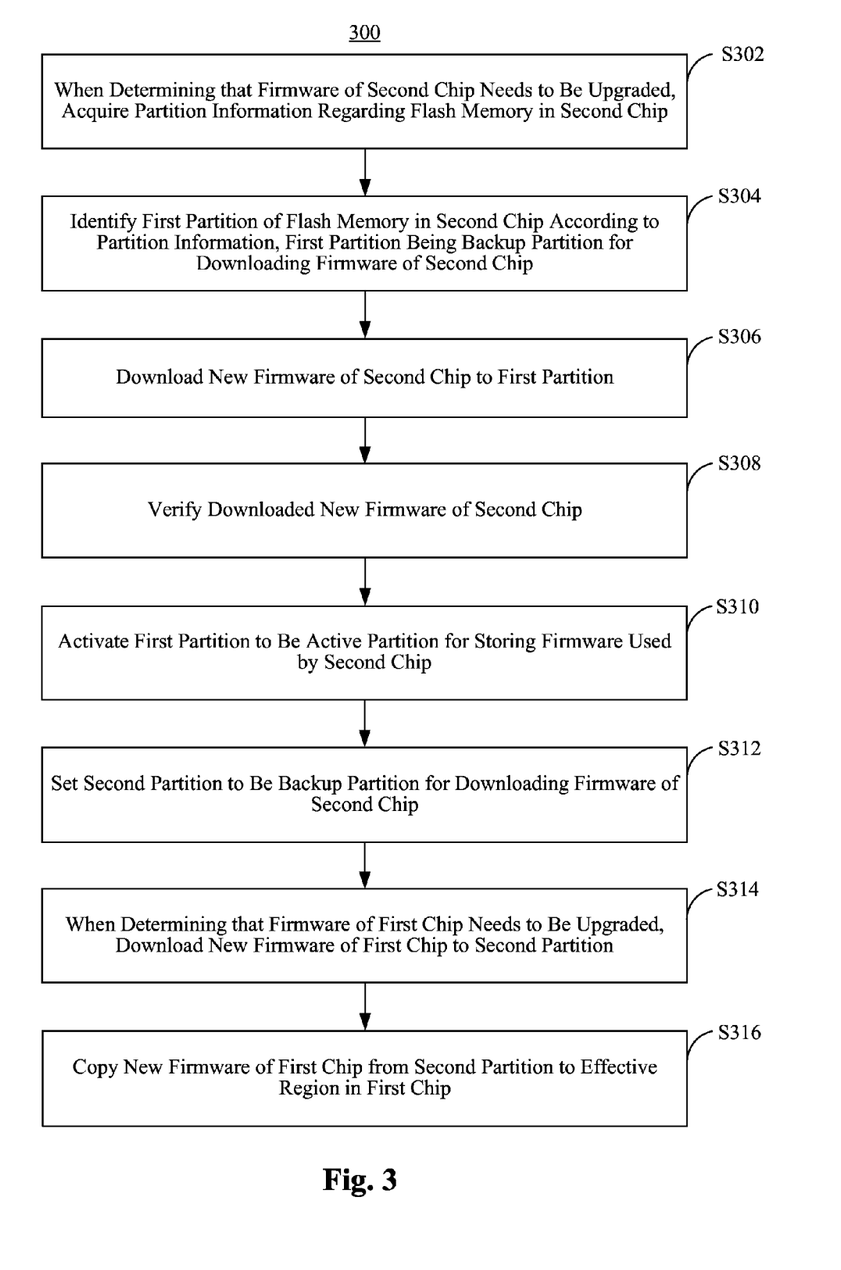
FIG. 3 is a flowchart of a method for upgrading firmware, according to an exemplary embodiment.

FIG. 3 is a flowchart of a method 300 for upgrading firmware, according to an exemplary embodiment. For example, the method 300 may be applied in a smart device, such as a smart plug, a smart television, a smart air conditioner, a smart phone, etc. The smart device may include a first chip and a second chip. The first chip may be a non-MCU chip, such as a WiFi chip, a Bluetooth chip, etc. The second chip may be a MCU chip including at least a flash memory. Referring to FIG. 3, the method 300 includes the following steps.

In step S302, when determining that firmware of the second chip needs to be upgraded, the smart device acquires partition information regarding the flash memory in the second chip.

In exemplary embodiments, similar to step S102 (FIG. 1), the firmware of the second chip may be triggered to be upgraded by remote control or by triggering a button on the smart device. The flash memory in the second chip may include a first partition and a second partition. For example, the first partition is a backup partition for downloading the firmware of the second chip. Also for example, the second partition is an active partition for storing firmware currently used by the second chip. The partition information indicates the locations of the first partition and the second partition in the flash memory.

In step S304, the smart device identifies the first partition of the flash memory in the second chip being the backup partition, according to the partition information.

In step S306, the smart device downloads new firmware of the second chip to the first partition.

In step S308, the smart device verifies the downloaded new firmware of the second chip.

In step S310, the smart device activates the first partition to be an active partition for storing firmware used by the second chip.

In step S312, the smart device sets the second partition to be the backup partition for downloading firmware of the second chip.

In exemplary embodiments, steps S302-S312 are similar to steps S202-S212 (FIG. 2), respectively.

In step S314, when determining that the firmware of the first chip needs to be upgraded, the smart device downloads new firmware of the first chip to the second partition of the flash memory of the second chip that has been set to the backup partition.

In step S316, the smart device copies the new firmware of the first chip from the second partition of the flash memory of the second chip to an effective region in the first chip.

FIGS. 4A-4E are schematic diagrams illustrating the implementation of a method for upgrading firmware in a smart device 400, according to an exemplary embodiment. When the firmware in two or more chips needs to be upgraded, the smart device 400 implements one or more of methods 100-300 to upgrade the firmware. The smart device 400 includes at least one chip that has a flash memory. The smart device 400 can use various partitions in the flash memory to upgrade firmware. Referring to FIGS. 4A-4E, the smart device 400 includes at least a first chip and a second chip. For example, the first chip may be a WiFi chip 420, and the second chip may be a MCU chip 410 including a flash memory. In the present embodiment, the firmware in both the MCU chips 410 and the WiFi chip 420 needs to be upgraded. The smart device 400 may upgrade the firmware in the MCU chip 410 and the WiFi chip 420 in the following manner.

Figure 4A:
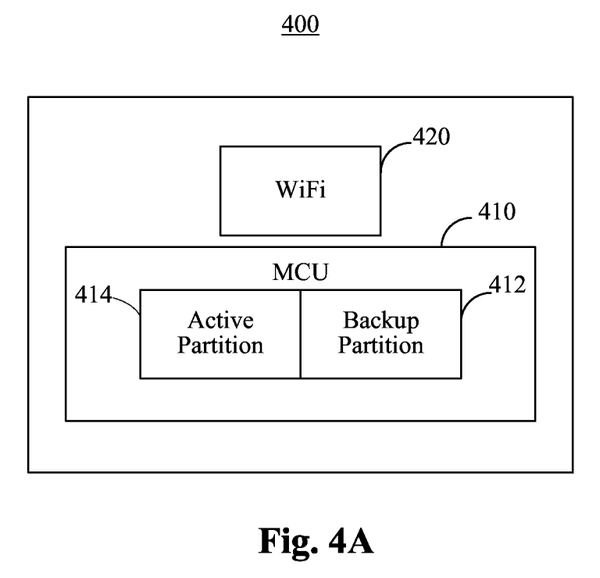
FIGS. 4A-4E are schematic diagrams illustrating an implementation of a method for upgrading firmware, according to an exemplary embodiment.

Referring to FIG. 4A, the flash memory in the MCU chip 410 includes a first partition 412 and a second partition 414. The first partition 412 is a backup partition for downloading new firmware of the MCU chip 410. The second partition 414 is an active partition for storing firmware used by the MCU chip 410.

Figure 4B:
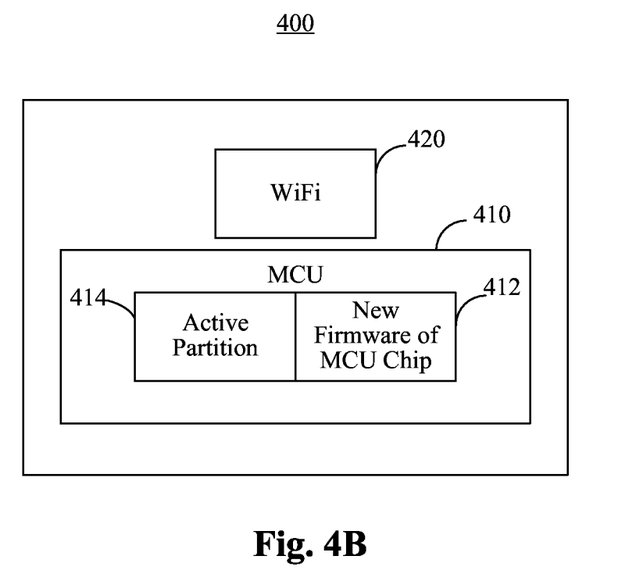
Figure 4C:
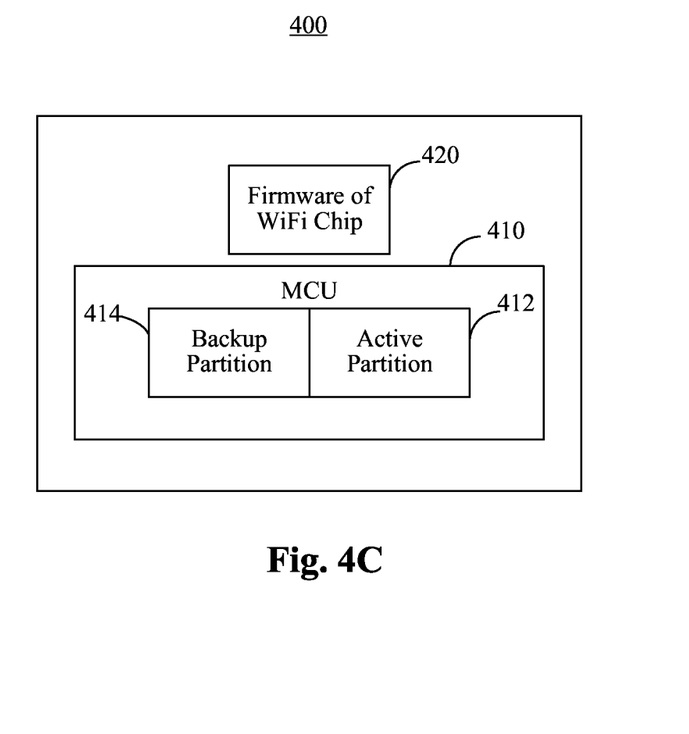

Referring to FIG. 4B, the smart device 400 may remotely download new firmware of the MCU chip 410 to the first partition 412. Referring to FIG. 4C, the smart device 400 verifies the new firmware of the MCU chip 410. After confirming that the new firmware of the MCU chip 410 is operable, the smart device 400 activates the first partition 412 to be an active partition, and sets the second partition 414 to be a backup partition.

Figure 4D:
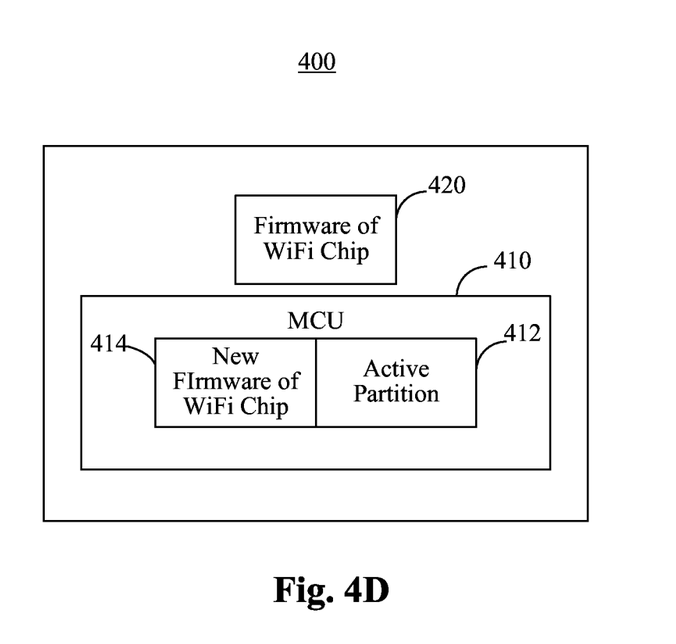
Figure 4E:
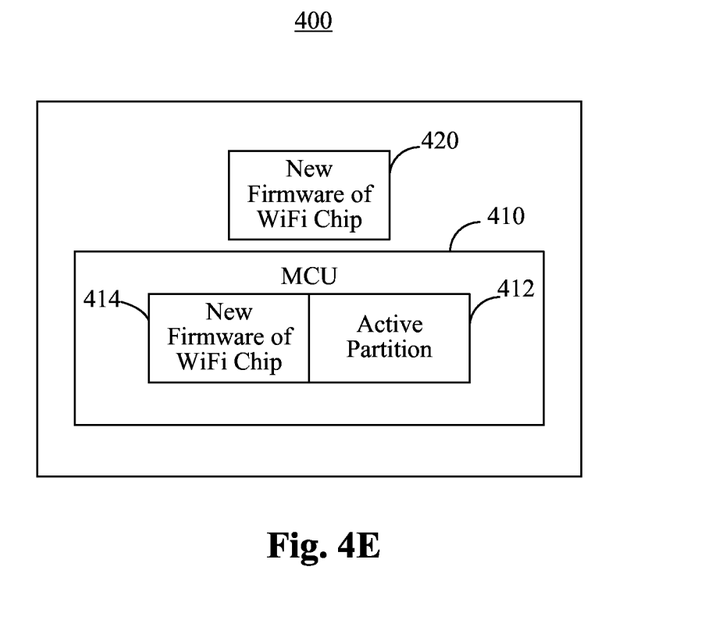

Referring to FIG. 4D, the smart device 400 may remotely download new firmware of the WiFi chip 420 to the second partition 414 that has been set to be the backup partition. Referring to FIG. 4E, the smart device 400 verifies the new firmware of the WiFi chip 420, and copies the new firmware of the WiFi chip 420 from the second partition 414 to the WiFi chip 420 and overwrites the previous version of the firmware in the WiFi chip 420. As a result, the firmware upgrade is completed.

Figure 5:
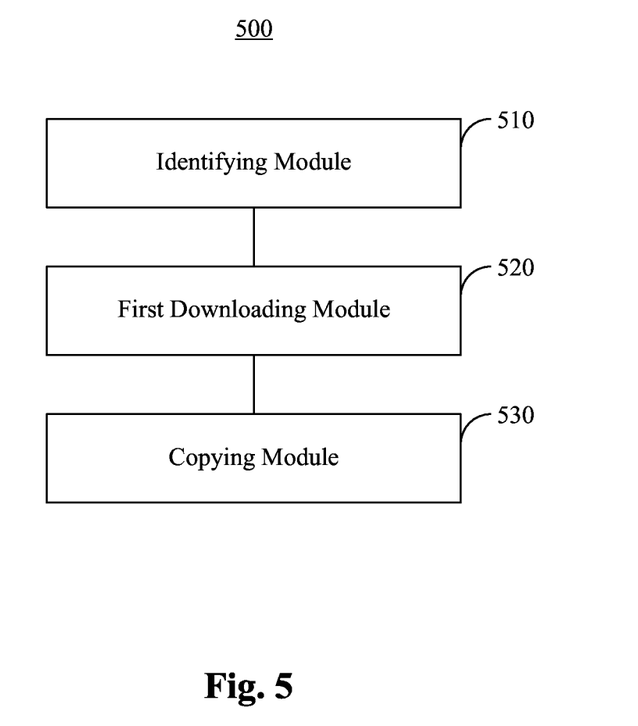
FIG. 5 is a block diagram of a device for upgrading firmware, according to an exemplary embodiment.

FIG. 5 is a block diagram of a device 500 for upgrading firmware, according to an exemplary embodiment. For example, the device 500 may be a part or whole of a smart device, such as a smart plug, a smart television, a smart air conditioner, a smart phone, etc. The smart device may include a first chip and a second chip. The first chip may be a non-MCU chip, such as a WiFi chip, a Bluetooth chip, etc. The second chip may be a MCU chip including at least a flash memory. Referring to FIG. 5, the device 500 includes an identifying module 510, a first downloading module 520, and a copying module 530.

The identifying module 510 is configured to identify a first partition of the flash memory in the second chip, when it is determined that firmware of the first chip needs to be upgraded. For example, the first partition is a backup partition for downloading firmware of the second chip.

The first downloading module 520 is configured to download new firmware of the first chip to the first partition.

The copying module 530 is configured to copy the downloaded new firmware of the first chip from the first partition to an effective region in the first chip.

Figure 6:
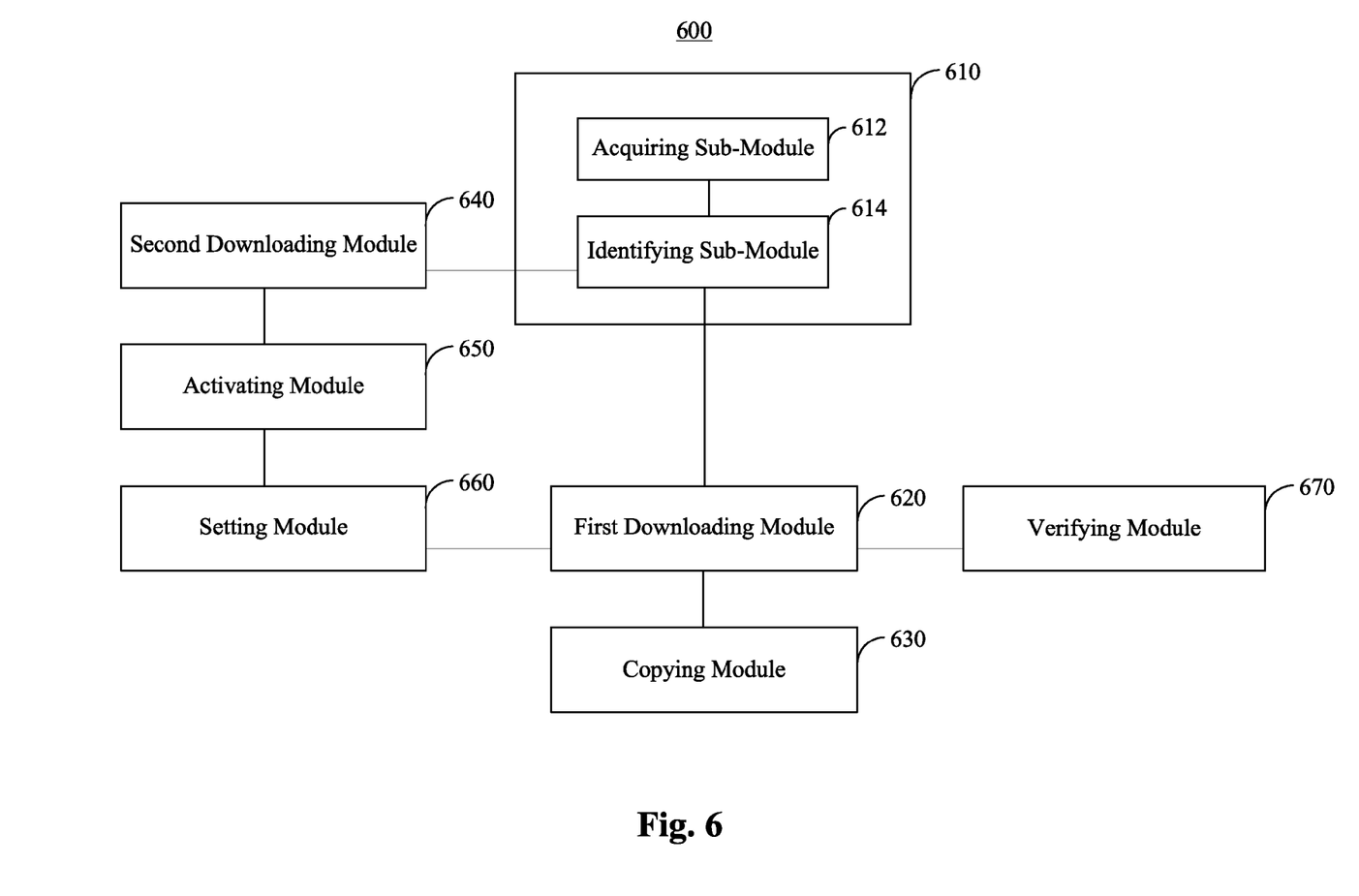
FIG. 6 is a block diagram of a device for upgrading firmware, according to an exemplary embodiment.

FIG. 6 is a block diagram of a device 600 for upgrading firmware, according to an exemplary embodiment. For example, the device 600 may be a part or whole of a smart device, such as a smart plug, a smart television, a smart air conditioner, a smart phone, etc. The smart device may include a first chip and a second chip. The first chip may be a non-MCU chip, such as a WiFi chip, a Bluetooth chip, etc. The second chip may be a MCU chip including at least a flash memory. Referring to FIG. 6, the device 600 includes an identifying module 610, a first downloading module 620, a copying module 630, a second downloading module 640, an activating module 650, and a setting module 660.

The identifying module 610, the first downloading module 620, and the copying module 630 are similar to the identifying module 510, the first downloading module 520, and the copying module 530 (FIG. 5), respectively.

The second downloading module 640 is configured to download new firmware of the second chip to a first partition identified by the identifying module 610, when it is determined that firmware of the second chip needs to be upgraded. For example, the first partition is a backup partition for downloading firmware of the second chip.

The activating module 650 is configured to activate the first partition to be an active partition for storing firmware to be used by the second chip, after the second downloading module 640 downloads the new firmware of the second chip.

The setting module 560 is configured to set a second partition of the flash memory to be a backup partition for downloading firmware of the second ship, after the activating module 650 activates the first partition. This way, next time when firmware of the first chip needs to be upgraded, the identifying module 610 may identify the backup partition for storing new firmware.

In some embodiments, referring to FIG. 6, the identifying module 610 further includes an acquiring sub-module 612 and an identifying sub-module 614. The acquiring sub-module 612 is configured to acquire partition information regarding the flash memory in the second chip. The identifying sub-module 614 is configured to identify a backup partition of the flash memory according to the partition information.

In some embodiments, referring to FIG. 6, the device 600 further includes a verifying module 670 configured to verify new firmware downloaded by the first downloading module 620.

Figure 7:
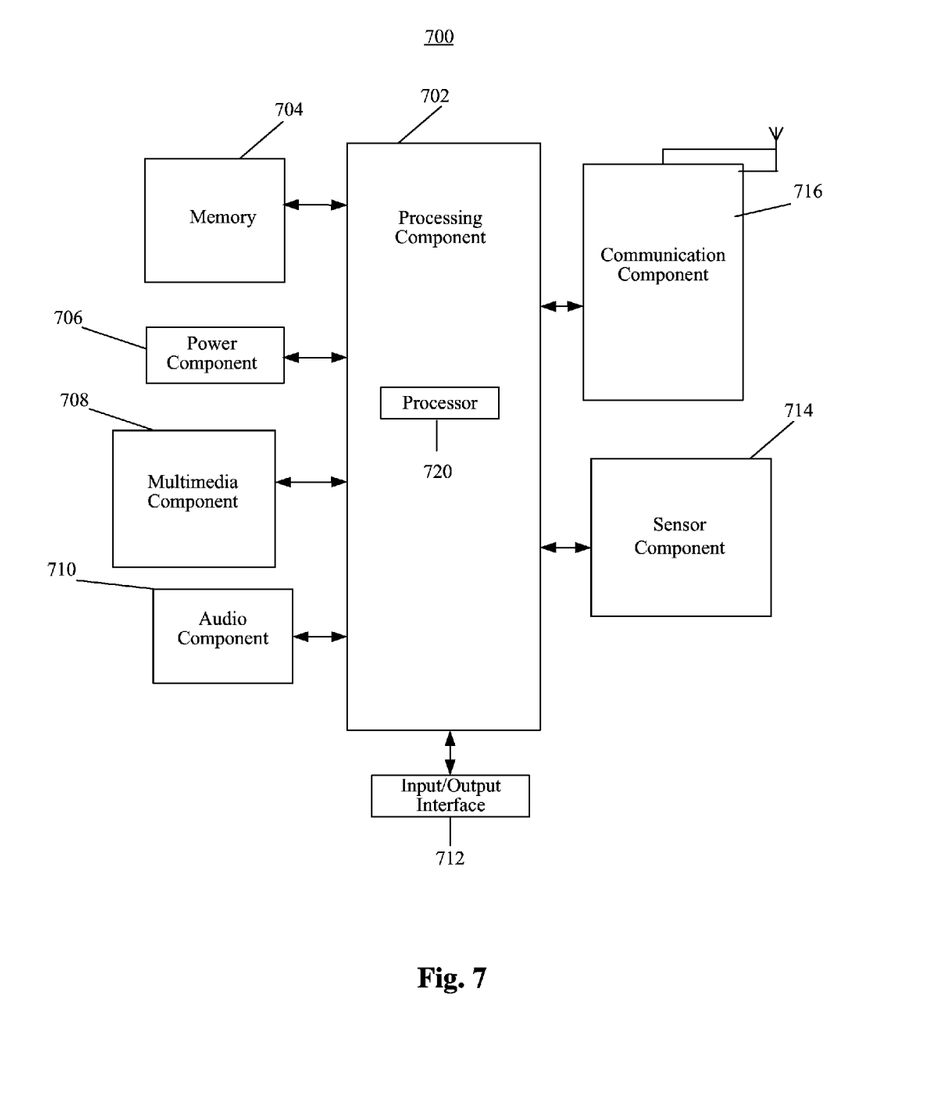
FIG. 7 is a block diagram of a device for upgrading firmware, according to an exemplary embodiment.

FIG. 7 is a block diagram of a device 700 for upgrading firmware, according to an exemplary embodiment. For example, the device 700 may be a smart plug, a smart television, a smart air conditioner, a smart phone, a computer, a digital broadcast terminal, a messaging device, a gaming console, a tablet device, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above-described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operations of the device 700. Examples of such data include instructions for any applications or methods operated on the device 700, contact data, phonebook data, messages, pictures, videos, etc. The memory 704 may be implemented by using any type of volatile or non-volatile memory devices or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power to various components of the device 700. The power component 706 may include a power management system, one or more power sources, and other components associated with the generation, management, and distribution of power for the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration of time and a pressure associated with the touch or swipe action. In some embodiments, the multimedia component 708 includes a front camera and/or a rear camera. The front camera and/or the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive external audio signals when the device 700 is in an operation mode, such as a call mode, a recording mode and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but not limited to, a home page button, a volume button, a starting button, and a locking button.

The sensor component 714 includes one or more sensors to provide status assessments of various aspects of the device 700. For instance, the sensor component 714 may detect an open/closed status of the device 700, relative position of components, e.g., the display and the keyboard, of the device 700, a change in position of the device 700 or a component of the device 700, a presence or absence of an user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may further include a light sensor, such as a CMOS or CCD image sensor, for use in imaging applications. In some embodiments, the sensor component 714 may further include an accelerometer sensor, a gyroscope sensor, a magnetic sensor, a pressure sensor, or a temperature sensor.

The communication component 716 is configured to facilitate communication, in a wire or wireless manner, between the device 700 and other devices. The device 700 may access a wireless network according to a communication standard, such as WiFi, 2G, or 3G, or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented according to a radio frequency identification (RFID) technology, an infrared data association (IrDA) technology, an ultra-bandwidth (UWB) technology, a Bluetooth (BT) technology, and other technologies.

In exemplary embodiments, the device 700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above-described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of submodules.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as coming within known or customary practice in the art. It is intended that the specification and examples be considered as exemplary only, with a true scope and spirit of the invention being indicated by the following claims.

It should be understood that the present disclosure is not limited to the exact constructions that are described above and illustrated in the accompanying drawings, and that various modifications and changes may be made without departing from the scope thereof. It is intended that the scope of the present disclosure only be limited by the appended claims.

What is claimed is:

1. A method for upgrading firmware in a device, wherein the device includes a first chip and a second chip independent from the first chip, the first chip being a WiFi chip or a Bluetooth chip, and the second chip being a Micro Control Unit chip, the method comprising:
when firmware used by the first chip needs to be upgraded:
identifying a first partition of a flash memory in the second chip, the first partition being a backup partition for downloading firmware used by the second chip;
downloading new firmware to be used by the first chip to the first partition of the flash memory in the second chip; and
copying the new firmware to be used by the first chip from the first partition of the flash memory in the second chip to the first chip; and
when firmware used by the second chip needs to be upgraded:
downloading new firmware to be used by the second chip to the first partition of the flash memory in the second chip;
activating the first partition to be an active partition for storing firmware used by the second chip; and
setting a second partition of the flash memory to be the backup partition.

2. The method according to claim 1, wherein the identifying of the first partition of the flash memory in the second chip comprises:
acquiring partition information regarding the flash memory; and
identifying the first partition according to the partition information.

3. The method according to claim 1, further comprising verifying the downloaded new firmware to be used by the first chip.

4. A device including a first chip and a second chip independent from the first chip, the first chip being a WiFi chip or a Bluetooth chip, and the second chip being a Micro Control Unit chip, the device comprising:
a processor; and
a memory for storing instructions executable by the processor;
wherein the processor is configured to:
when firmware used by the first chip needs to be upgraded:
identify a first partition of a flash memory in the second chip, the first partition being a backup partition for downloading firmware used by the second chip;
download new firmware to be used by the first chip to the first partition of the flash memory in the second chip; and
copy the new firmware to be used by the first chip from the first partition of the flash memory in the second chip to the first chip; and
when firmware used by the second chip needs to be upgraded:
download new firmware to be used by the second chip to the first partition of the flash memory in the second chip;
activate the first partition to be an active partition for storing firmware used by the second chip; and
set a second partition of the flash memory to be the backup partition.

5. The device according to claim 4, wherein the processor is further configured to:
acquire partition information regarding the flash memory; and
identify the first partition according to the partition information.

6. The device according to claim 4, wherein the processor is further configured to verify the downloaded new firmware to be used by the first chip.

7. A non-transitory computer-readable storage medium storing instructions that, when executed by one or more processors of a device, cause the device to perform a method for upgrading firmware, wherein the device includes a first chip and a second chip independent from the first chip, the first chip being a WiFi chip or a Bluetooth chip, and the second chip being a Micro Control Unit chip, the method comprising:
when firmware used by the first chip needs to be upgraded:
identifying a first partition of a flash memory in the second chip, the first partition being a backup partition for downloading firmware used by the second chip;
downloading new firmware to be used by the first chip to the first partition of the flash memory in the second chip; and
copying the new firmware to be used by the first chip from the first partition of the flash memory in the second chip to the first chip; and
when firmware used by the second chip needs to be upgraded:
downloading new firmware to be used by the second chip to the first partition of the flash memory in the second chip;
activating the first partition to be an active partition for storing firmware used by the second chip; and
setting a second partition of the flash memory to be the backup partition.

8. The storage medium according to claim 7, wherein the identifying of the first partition of the flash memory in the second chip comprises:
acquiring partition information regarding the flash memory; and
identifying the first partition according to the partition information.

9. The storage medium according to claim 7, wherein the method further comprises verifying the downloaded new firmware to be used by the first chip.

* * * * *